UNITED STATES PATENT OFFICE.

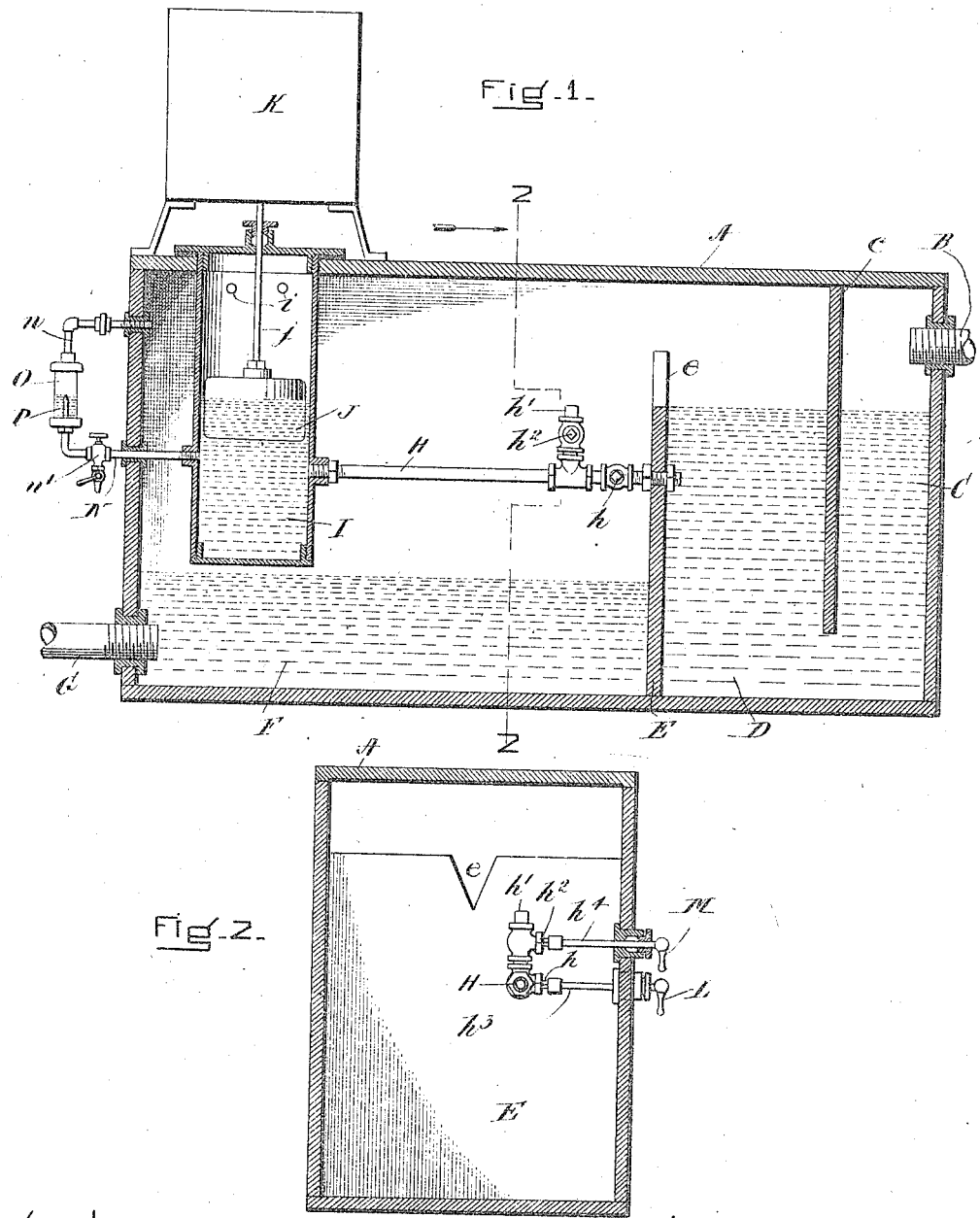

CHARLES E. ANDERSON, OF NEEDHAM, MASSACHUSETTS.

LIQUID-FLOW METER.

1,161,279.   Specification of Letters Patent.   Patented Nov. 23, 1915.

Application filed October 17, 1914. Serial No. 867,171.

*To all whom it may concern:*

Be it known that I, CHARLES E. ANDERSON, a citizen of the United States, residing at Needham, in the county of Norfolk and Commonwealth of Massachusetts, have invented a new and useful Improvement in Liquid-Flow Meters, of which the following is a specification.

My invention relates to liquid-flow meters of a type commonly used in connection with the water supply for steam boilers wherein a recording instrument in connection with the meter tank and operating through the rise and fall of a float registers the amount of water flowing through a notch in a partition plate within the tank.

It has been the special object of my invention to so construct and arrange my device that the accuracy of the recording instrument may be tested and the instrument adjusted without interruption of the flow of water through the meter tank to the boiler. The use of my improvement is, therefore, designed to eliminate the necessity of "cutting out" a meter and interrupting the flow of water through it while testing the accuracy of the adjustment of the recording instrument. This object I have accomplished by providing means for drawing water from the float chamber until its level is that of the apex of the notch or weir in the still water chamber without regard to the height of water in this chamber, which is normally in communication with the float chamber, and by providing further means for determining accurately when this level has been attained.

My invention may be best understood by reference to the accompanying drawing in which—

Figure 1 is a longitudinal cross-section of a meter tank with its contents and connections, showing a side view of a case for holding a recording instrument mounted thereon. Fig. 2 is a cross-section on line 2—2 on Fig. 1 viewed in the direction indicated by the arrow, showing more particularly the notch plate and means for interrupting and diverting the flow of water between the still water chamber and the float chamber.

Referring now more specifically to the drawing A is a rectangular tank to which is connected a supply pipe B emptying into the down-take chamber C which is separated from the still water chamber D by the baffle plate $c$ which quiets the agitation of the water as it enters through the supply pipe B. The notch plate E constitutes the end wall of the still water chamber and is provided with a weir or notch $e$ through which water may flow into the out-board chamber F and thence through outlet G to the boiler feed-pump or other destination. A pipe H connects the still water chamber with the float chamber I and being normally open the water in chambers D and I is thus maintained normally at the same levels and the rise and fall thereof actuates the float J which operates through the stem $j$ an indicator (not shown) of any well-known type which may be enclosed in case K. Pipe H is provided with a valve $h$ which is normally kept open. A riser $h^1$ extends upwardly from pipe H to the level of the apex of the notch $e$ and is provided with a valve $h^2$ which is normally kept closed. These valves $h$ and $h^2$ are controlled by stems $h^3$ and $h^4$ which protrude through the side of the tank A and are provided with handles L and M whereby they may be operated.

The float chamber I has vents $i$ in order that the water therein may rise and fall freely under the same pressure as that of the still water chamber. The pipe N runs from the float chamber through the side of tank A and enters a water gage glass O which is vented at its top by a pipe $n$ which enters tank A, thereby insuring the same pressure in the water gage glass as is encountered by the liquid within the tank. The pipe N is provided with a pet-cock $n^1$ through which water may be drawn off. Within the water gage glass is a metal pointer P, the top of which may be adjustable so that it may be accurately positioned at the same level as the apex of the notch $e$ and the top of the riser pipe $h^1$.

The operation of my device is as follows: It is to be assumed that the meter has been set in a position so that the top of the pointer P is at the same level as the apex of notch $e$. Water is flowing from the still water chamber D through the weir or notch $e$, the water in the chamber D being consequently at a substantially higher level than the apex or notch $e$ and standing at the same level in the float chamber I, thereby causing a certain positioning of float J and its stem $j$, and consequently resulting in a certain reading on the dial or indicator of the recording instrument to which it is attached. It will be readily understood that valve $h$ is in its normal open position and valve $h^2$ is in its normal closed position. If now it is desired to determine whether the recording instrument has been moved upward from a correctly established zero reading so that its present reading is accurate this may be done by reducing the level of the water in float chamber I to that of the apex of notch $e$, which is the so-called zero level above which the rise of water in float chamber I actuates the recording instrument. To accomplish this valve $h$ is closed and valve $h^2$ is opened, thereby permitting water to flow out of the float chamber I through pipe H and riser $h^1$ until the level of water in float chamber I is reduced to the level of the top of riser pipe $h^1$ which is at the zero level or level of the apex of notch $e$. This operation may not be accurate owing to friction in the pipe H and riser $h^1$ and owing further to capillary attraction and to the surface tension of the water at the top of riser pipe $h^1$. In order to correct this possible inaccuracy the state of the gage glass O should be carefully observed and if the zero pointer is still slightly submerged a small amount of water may be withdrawn from float chamber I by opening pet-cock $n^1$ thus obtaining the necessary correct adjustment of zero level in float chamber I and causing the float J to fall to this level, thereby giving a zero reading of the recording instrument if this instrument itself is in proper adjustment, which is the fact to be determined, and which adjustment may be made if the dial reading of the recording instrument is not now at zero.

It is obvious that by closing the passage through pipe H the water may be withdrawn from the float chamber I to zero level by various means which may be readily provided. It might be done for instance wholly through the pet-cock $n^1$ although this would be a very slow method and the apparatus which I have above described, namely riser pipe $h^1$, is to be of such substantial diameter that the flow of water through it will speedily reduce the level of the water in the float chamber so that a test may be quickly finished and the measurement of the flow of water resumed, it being obvious that the flow of water through the notch or weir into the out-board chamber and thence to the feed pump has not been interrupted during this process of reducing the level of water in the float tank and checking the correctness of the recording instrument, as above set forth.

Having thus fully described my invention what I claim is—

1. In a device of the character specified the combination of a chamber provided with an outlet for a flow of water to be measured, a float chamber, a float therein, a recording instrument actuated by said float, a pipe connecting said chambers, a pipe connected with said pipe and rising above it to the level of the lowest point of said outlet, and valves for controlling said pipes in a manner whereby liquid may be withdrawn from said float chamber until its level is that of the lowest point of said outlet.

2. In a device of the character specified the combination of a chamber provided with an outlet for a flow of water to be measured, a float chamber, a float therein, a recording instrument actuated by said float, a passage connecting said chambers, means for closing said passage, means for reducing the level of liquid in said float chamber to the level of the lowest point of said outlet, and means for determining accurately when said level of said liquid has been obtained.

3. In a device of the character specified the combination of a chamber provided with an outlet for a flow of water to be measured, a float chamber, a float therein, a recording instrument actuated by said float, a passage connecting said chambers, means for closing said passage, a pipe communicating with said float chamber and rising to the level of the lowest point of said outlet, a valve whereby said pipe may be controlled to permit the withdrawal of water from said float chamber, a gage glass connected with said chamber and provided with a pointer designed to indicate when the level of water in said gage glass and float chamber is that of the lowest point of said outlet, and a supplementary means for withdrawing a small quantity of liquid from said float chamber.

4. Weir measuring apparatus comprising a chamber provided with a weir outlet and a float chamber separate from the first mentioned chamber, a float therein, flow exhibiting mechanism actuated by said float, and in combination therewith, a level indicating gage for accurately indicating when the level in said float chamber bears a predetermined relation to the level of the lowest point of said outlet, valved means connecting said chambers whereby a liquid level equalizing connection between said chambers may be maintained or interrupted, and means for varying the liquid accumulation in said float chamber when said connection is interrupted to thereby bring the liquid level in the float chamber into said predetermined relation.

In witness whereof I have hereunto set my hand in the presence of two subscribing witnesses.

CHARLES E. ANDERSON.

Witnesses:
M. E. O'CONNELL,
JAMES J. COOGAN.